US012696136B2

(12) United States Patent
Zhou et al.

(10) Patent No.: US 12,696,136 B2
(45) Date of Patent: Jul. 28, 2026

(54) APPLICATION LAYER CONTROL PLANE

(71) Applicant: AT&T Intellectual Property I, L.P., Atlanta, GA (US)

(72) Inventors: Jianchun Zhou, Bellevue, WA (US); Yakun Gao, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 307 days.

(21) Appl. No.: 18/508,593

(22) Filed: Nov. 14, 2023

(65) Prior Publication Data

US 2025/0159554 A1     May 15, 2025

(51) Int. Cl.
H04W 28/10          (2009.01)
H04W 52/02          (2009.01)
H04W 76/28          (2018.01)

(52) U.S. Cl.
CPC ....... H04W 28/10 (2013.01); H04W 52/0206 (2013.01); H04W 76/28 (2018.02)

(58) Field of Classification Search
CPC .. H04W 28/10; H04W 76/28; H04W 52/0206
USPC ........................................................ 370/229
See application file for complete search history.

(56) References Cited

U.S. PATENT DOCUMENTS

| | | | |
|---|---|---|---|
| 9,198,107 B1* | 11/2015 | Pierce ................... | H04W 4/021 |
| 2012/0184284 A1* | 7/2012 | Moisio .................. | H04W 48/16 |
| | | | 455/452.1 |
| 2015/0270877 A1* | 9/2015 | Hessler ............. | H04W 36/0085 |
| | | | 370/329 |
| 2022/0417855 A1* | 12/2022 | Shukla .................. | H04W 52/46 |
| 2025/0220770 A1* | 7/2025 | Xiang ................... | H04W 76/27 |

* cited by examiner

*Primary Examiner* — John A Follansbee

(74) *Attorney, Agent, or Firm* — Guntin & Gust, PLC; Bryan S. Latham

(57)          ABSTRACT

Aspects of the subject disclosure may include, for example, detecting data traffic at the application layer of a communication device and dividing the application data into two groups, C-plane and U-plane, based on delay-sensitive and non-delay-sensitive characteristics. The method involves determining whether the data traffic is delay-sensitive, routing the data traffic to a control plane group within the application layer if it is determined to be delay-sensitive, and transmitting the data traffic over the control plane using a wireless connection to a remote device in accordance with system timing designated for control plane traffic. Other embodiments are also disclosed.

20 Claims, 11 Drawing Sheets

100

Prior Art

202

230

300

600

APPLICATION LAYER CONTROL PLANE

FIELD OF THE DISCLOSURE

This disclosure relates generally to use of application layer control plane information in a mobile device operating on a mobile network.

BACKGROUND

Fifth generation (5G) mobile systems enable new applications and uses. Such new applications include enhanced Mobile Broadband (eMBB), massive Machine Type Communication (mMTC) and Ultra-reliable Low Latency Communications (URLLC). For URLLC and mMTC, low end-to-end (E2E) latency at application layer (user level) is as critical as high throughput. Network optimizations must be made at every step of both the uplink (UL) and downlink (DL) transmission and processing.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for creating a control plane and a data plane or user plane on an application layer of a communication device such as user equipment (UE). In accordance with various aspects described herein, communications from applications operating on the UE device are separated according to delay sensitivity. Substantially all delay-sensitive communications or messages are assigned to the control plane or C-plane of the UE device and are routed to a dedicated particular slice of a communication network in order to reduce or minimize latency of communications involving the communications device. Other embodiments are described in the subject disclosure.

One or more aspects of the subject disclosure include detecting data traffic on an application layer of a communication device, determining if the data traffic is delay-sensitive data traffic, routing the data traffic to a control plane of the application layer, wherein the routing the data traffic to the control plane is responsive to a determination that the data traffic is delay-sensitive data traffic, and communicating the data traffic on the control plane over a wireless connection to a remote device according to system timing for control plane traffic.

One or more aspects of the subject disclosure include receiving an input to an application operating on the processing system, generating data traffic responsive to the input, communicating the data traffic on an application layer of the processing system, determining if the data traffic is delay-sensitive data traffic, and assigning the data traffic on a control plane of the application layer, wherein the assigning the data traffic on the control plane is responsive to the determining the data traffic is delay-sensitive data traffic. Aspects of the disclosure further include communicating the data traffic on the control plane to a radio circuit for communication by the radio circuit over a wireless connection to a remote device, the radio circuit communicating the data traffic substantially immediately in response to the assigning the data traffic on the control plane of the application layer, to reduce latency of wireless communications between the radio circuit and the remote device.

One or more aspects of the subject disclosure include detecting data traffic on an application layer of a communication device, the data traffic including delay-sensitive messages and non-delay sensitive messages, routing the delay-sensitive messages to a control plane of the application layer, routing the non-delay sensitive messages to a user plane of the application layer, and communicating the delay-sensitive messages on the control plane substantially immediately to reduce latency of wireless communications between the communication device and a remote device.

Figure 1:
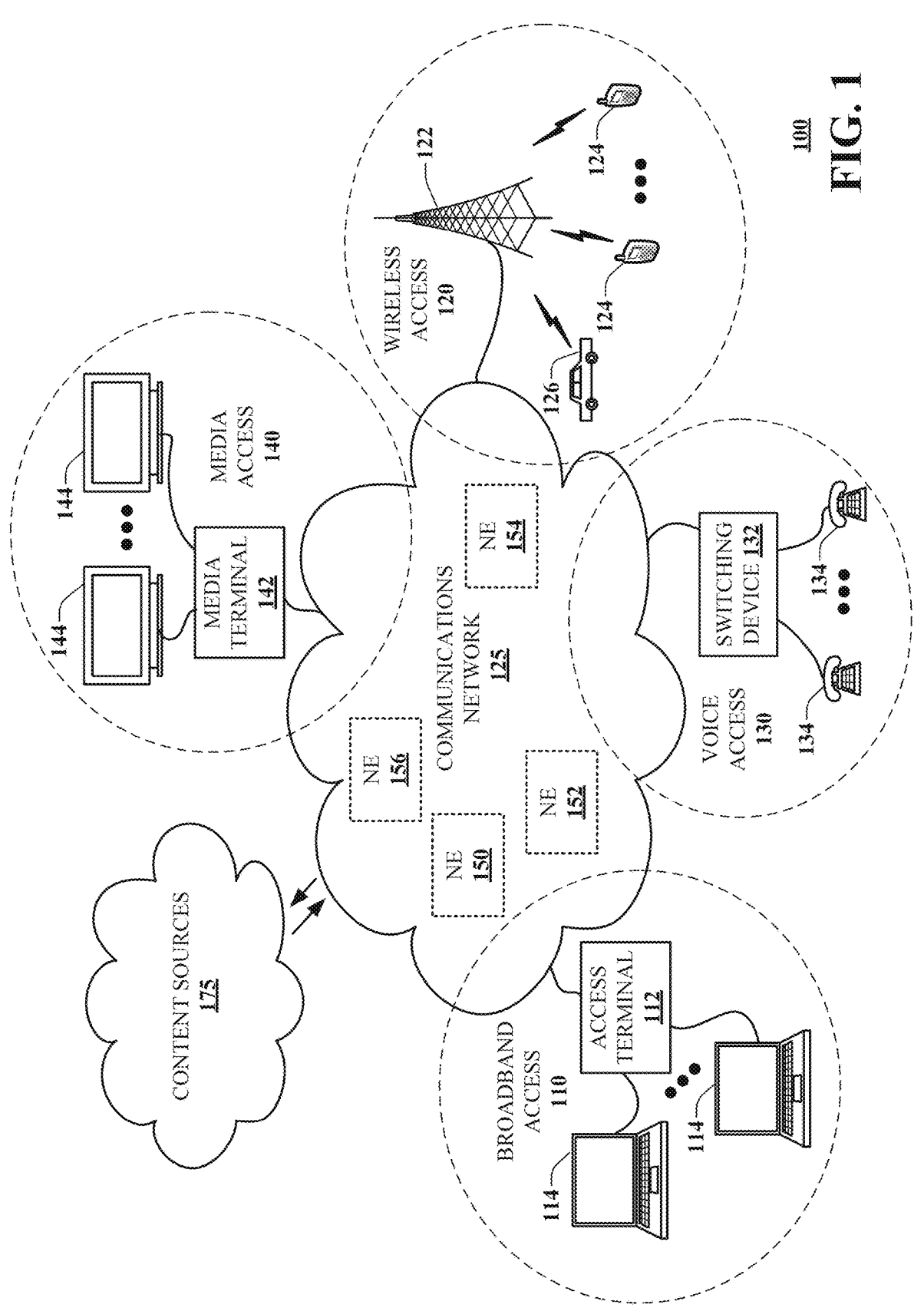
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part assigning application layer traffic in a communication device to a control plane or a user plane of the application layer. The control plane traffic is communicated promptly to reduce latency of communications by the communication device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Future planning for mobility networks such as wireless access 120 is provided in part by the International Telecommunication Union (ITU) and the 3rd Generation Partnership Project (3GPP). The ITU developed the International Mobile Telecommunications-2020 Standard (IMT-2020) for 5G networks, devices, and standards. The fifth generation (5G) mobility network is 3GPP's answer to IMT-2020. During early stages of 5G development, the focus has been on enhanced Mobile Broadband (eMBB). In the current and future years, more innovative services will come from the other two areas, including Ultra-reliable Low Latency Communications (URLLC) and massive Machine Type Communication (mMTC).

For URLLC and mMTC, low end-to-end (E2E) latency at the application layer (user level) may be as critical as the high data throughput, which has been a focus of eMBB. Network latency is a measure of the time delay for information to travel across a network, or to make a round trip path through the network. Generally, lower latency is associated with faster data transmission and improved user experience. Low latency is a key enabler for many advanced services promised by 5G networks such as cloud gaming, augmented reality (AR), virtual reality (VR) and mixed reality (MR), autonomous driving, telemedicine, and integration of intelligent digital technologies into manufacturing and industrial processes, sometimes called Industry 4.0. By ensuring that input lag or latency is reduced below an acceptable threshold, user experiences with these services can be delivered in a smooth and frictionless way to the end-user. URLLC requires E2E latency as low as 5-10 milliseconds (ms) to deliver frictionless experience to end users, which is far beyond any conventional live network can achieve today. Network optimizations must be made at every step of both the uplink (UL) and downlink (DL) transmission and processing. The uplink is a radio connection from a mobile device to a network element such as a base station. The downlink is the reverse connection, from the network element to the mobile device or user equipment (UE) device.

Figure 2A:
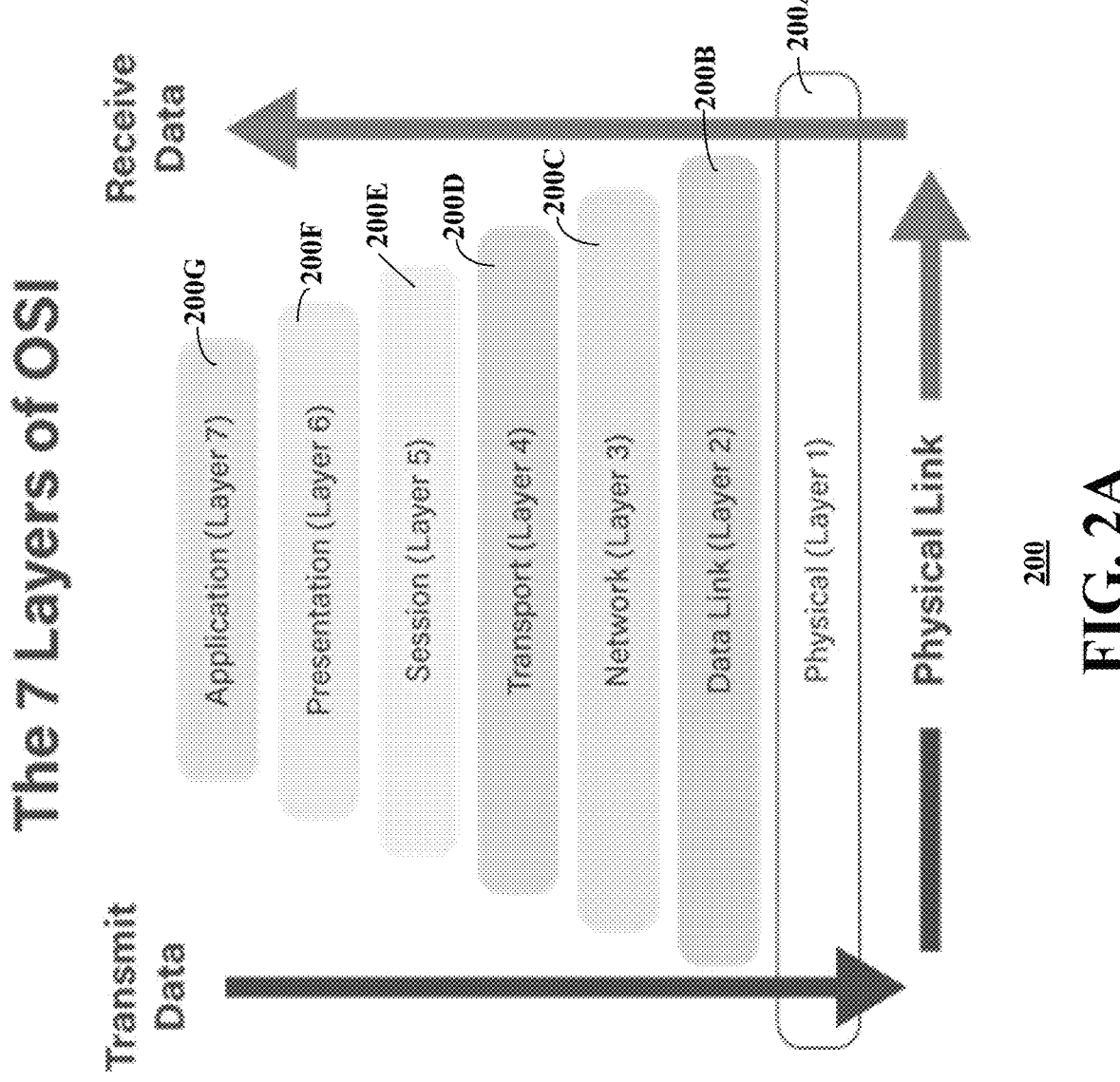
FIG. 2A is a block diagram illustrating the seven-layer OSI model for modeling operations within the communication network of FIG. 1 in accordance with various aspects described herein.

The seven layers of the Open Systems Interconnect OSI networking model provide an excellent reference on how to reduce E2E latency. FIG. 2A is a block diagram illustrating the seven-layer OSI model 200. The OSI model 200 describes seven layers that data processing systems use to communicate over a network. The physical layer 200A is responsible for the physical cable or wireless connection between network nodes. It defines the connector, the electrical cable or wireless technology connecting the devices, and is responsible for transmission of the raw data, which is simply a series of 0s and 1s, while taking care of bit rate control. The data link layer 200B stablishes and terminates a connection between two physically connected nodes on a network. The data link layer 200B breaks up packets into frames and sends them from source to a destination. This layer includes the media access control (MAC) layer which uses MAC addresses to connect devices and define permissions to transmit and receive data. The network layer 200C functions to establish and terminate a connection between two physically connected nodes on a network, as well as to break up packets into frames and send them from source to destination.

Further, the transport layer 200D takes data transferred in the session layer 200E and breaks it into segments for transmission. The transport layer 200D is responsible for reassembling the segments upon reception and converting segments into data that can be used by the session layer 200E. The transport layer 200D carries out flow control and error control. The session layer 200E creates communication channels, called sessions, between devices. The session layer 200E is responsible for opening sessions, ensuring they remain open and functional while data is being transferred, and closing them when communication ends. The presentation layer 200F prepares data for the application layer. It defines how two devices should encode, encrypt, and compress data so it is received correctly on the other end. The presentation layer 200F takes any data transmitted by the application layer and prepares it for transmission over the session layer 200E. The application layer 200G is used by end-user software such as web browsers and email clients. The application layer 200G provides protocols that allow software to send and receive information and present meaningful data to users. Examples of application layer protocols include Hypertext Transfer Protocol (HTTP) and File Transfer Protocol (FTP).

Conventionally, the industry has been concentrating on reducing the latency in OSI layers 1-4 (physical layer 200A, data link layer 200B, network layer 200C and the transport layer 200D) without including the application layer 200G as part of the overall solution. But the Application layer 200G also includes delay sensitive and non-delay-sensitive messages. Delivering the delay-sensitive message in time may be the most efficient way to reduce network latency because not all delay-sensitive services have all delay sensitive contents.

In network analysis and design, a network is defined to include a control plane and a data plane or user plane. The control plane is related to how data which is communicated in the network is managed, routed, and processed. The control plane may be considered to be a supervisor of data communication, controlling communication between different network components and collecting data from the data plane. The control plane utilizes various protocols, such as routing protocols including border gateway protocol (BGP), open shortest path first (OSPF) protocol, and intermediate system-intermediate system (IS-IS) protocol; network management protocols including simple network management protocol (SNMP); and application layer protocols including hyper-text transfer protocol (HTTP) and file transfer protocol (FTP). While the control plane supervises and directs communication, the data plane or user plane is responsible for the actual movement of data from one system to another. Examples of user planes include Ethernet networks, Wi-Fi networks, and cellular networks including 5G, sixth generation (6G) and other next-generation mobility networks. These networks support both the Control Plane and the User Plane as described herein. The control plane decides how data is managed, routed, and processed, while the user plane is responsible for the actual moving of data. For example, the control plane decides how packets should be routed, and the data plane carries out those instructions by forwarding the packets. The control plane is used for commands to build a connection between the network and a UE device, including assigning time slots and modulation schemes, and so forth, and the user plane is used for communicating user information once the connection is established.

In conventional 5G systems, the control plane (or C plane) and the data plane or user plane (or U plane) are separated in the network, but only on the physical layer 200A, the data link layer 200B, the network layer 200C and the transport layer 200D in FIG. 2A. Other OSI layers, including the session layer 200E, the presentation layer 200F and the application layer 200G, do not divide traffic among C-plane and U-plane.

As noted, ultra-reliable low latency communications (URLLC) capabilities have been newly developed for 5G networks. In the context of data communications, reliability refers to how well a system can deliver information dependably and accurately. Reliability may be expressed as a ratio of bits or bytes that are correctly received to bits or bytes that are transmitted, or as a bit error rate (BER). Latency refers to the time required for a packet of data to be sent from one network location to another, or to make a round trip from a source to a destination and back to the source. Latency may be measured in milliseconds (ms). Latency is one key performance indicator (KPI) of a network. Lower latency refers to faster data transfer and, generally, a better user experience.

URLLC presents a new category of delay-critical services introduced in 5G. Applications for URLLC services include discrete automation, intelligent transport systems, telemedicine, autonomous vehicles and Vehicle to Everything (V2X) services. Such applications may need to support end-to-end latencies as low as 5 ms and the delay budget for individual interfaces can be as low as 1 ms. Such low latencies means that optimizations must be made at every step of the uplink and downlink transmission and processing.

On the application layer 200G, much of the content is not delay-sensitive. This is true even of for data associated with a URLLC service. Generally, only some commands are delay-sensitive in a URLLC service. For example, if a user is playing an online game and clicks a controller to try to control a gun, the data associated with those actions is delay sensitive. On the other hand, when the user is searching within the game or mapping the game territory, those operations are not delay-sensitive. The application layer, which controls an application like the online game, includes both delay-sensitive and non-delay-sensitive content. Those content items can be flagged or marked or designated as being delay-sensitive or non-delay-sensitive and treated accordingly.

The seven layers of the OSI networking model 200 provide an excellent reference on how to reduce end-to-end latency. Currently, efforts are concentrated on reducing the latency in layer 1 through layer 4 of the OSI model 200 without including the application layer 200G as part of the overall solution. But the application layer 200G also includes delay sensitive and non-sensitive messages. Delivering the delay-sensitive message in time is the most efficient way to reduce the latency because not all of delay-sensitive services have all delay sensitive contents.

When data on the application layer 200G is not separated as delay and non-delay sensitive messages, extra delay could be introduced, for example when the periodic traffic falls into the sleep mode during a connected mode discontinuous reception (CDRX) cycle. CDRX is a 5G network feature for saving energy at the device level. CDRX allows a device to monitor scheduling messages during defined monitoring intervals, such as 10 ms on-durations during every 160 ms long discontinuous reception (DRX) interval. Otherwise, the device remains in a low-power sleep mode.

Ultra-reliable low latency communications (URLLC) require end-to-end latencies as low as 5 ms, that means that optimizations must be made at every step of the uplink and down link transmission and processing. One of processing obstacles is CDRX, which triggers extra delay when these applications have a traffic pattern that is bursty and falls into the sleep mode during a CDRX cycle, or during any discontinuous reception operation. Even in the case of the application sending critical, delay sensitive messages, the UE will not awaken until the CDRX cycle ends.

One issue pertains to waking the UE device from the CDRX sleep mode quickly, once the UE has UL data. One method is to introduce a C-plane concept in the application layer. Data on the application layer C-plane will wake the UE immediately, even during CRDX sleep mode because CRDX only monitors C-plane message. This modification can solve the extra delay issue due to CDRX.

Figure 2B:
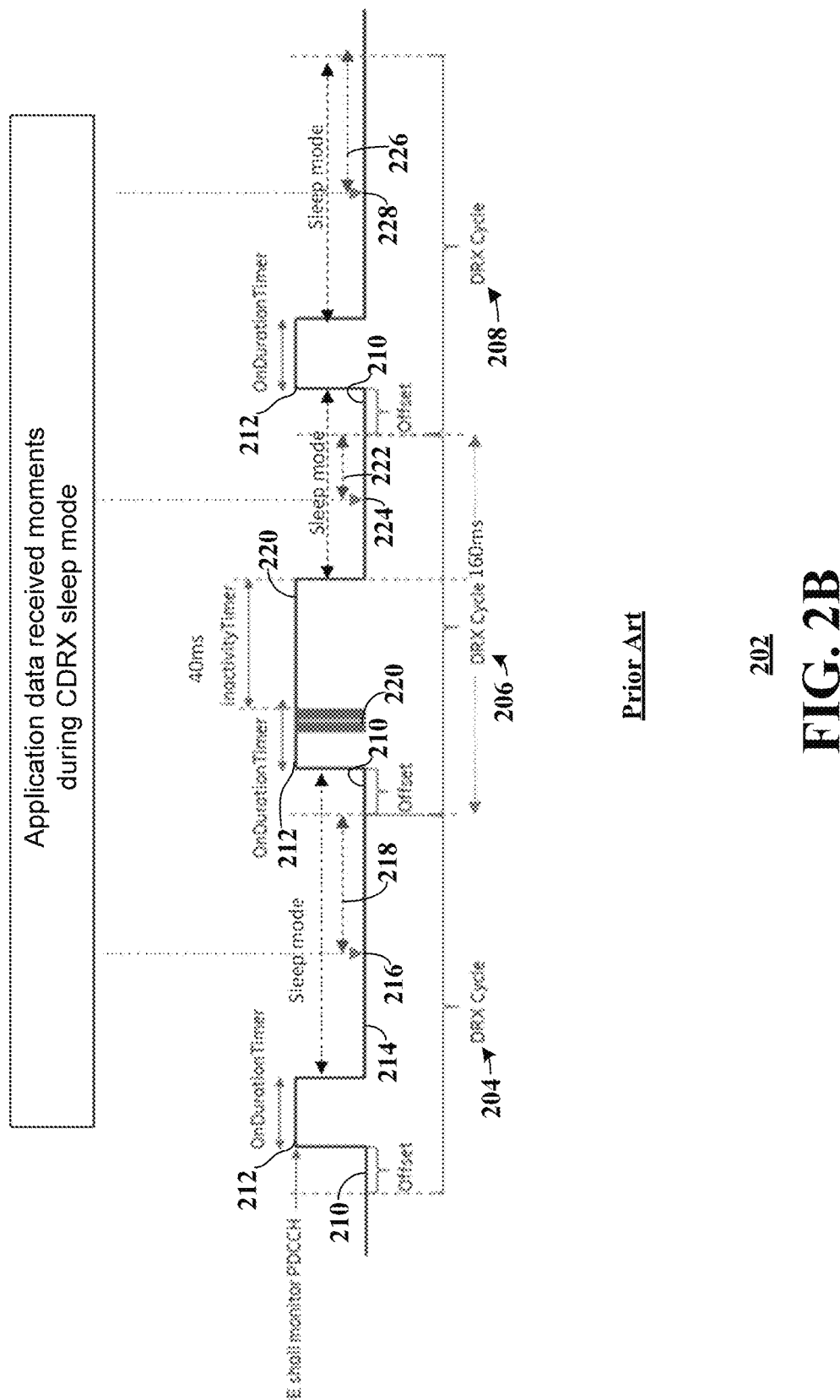
FIG. 2B is a block diagram illustrating an example of conventional system timing for a mobility network operating within the communication network of FIG. 1.

FIG. 2B is a block diagram illustrating an example of conventional system timing 202 for a mobility network operating within the communication network 125 of FIG. 1 in accordance with various aspects described herein. In particular, FIG. 2B illustrates timing and UE device response according to a CDRX cycle of the UE device. FIG. 2B includes a horizontal trace that generally shows activity level of the UE device, cycling between a low activity level or sleep mode and a high activity level or active mode, over time. The CDRX cycle includes a first CDRX interval 204, a second CDRX cycle 206, and a third CDRX cycle 208. As indicated, each CDRX interval or DRX cycle has a nominal duration of approximately 160 ms. Initially, the UE device is in a sleep mode. After an offset time 210, the UE device enters the active mode 212 to detect incoming communications on the physical downlink control channel (PDCCH). The PDCCH is a C-plane function and commands or other information in the PDCCH is C-plane data or control data. After elapse of an on-duration timer, if no active signaling has been received on the PDCCH, the UE device returns to the sleep mode 214 for the remainder of the 160 ms duration DRX cycle. Other than during the active mode, the radio transmitter and radio receiver of the UE are in a low energy, power saving state. The DRX or CDRX cycle provides substantially reduced energy consumption and reduced depletion of the battery which powers the UE device.

As indicated in the example of FIG. 2B, at a time 216, an application operating on the UE device receives data that must be processed. The application data can originate from any source, such as a keypress of the UE device by a user accessing the application, or by data generated by a process of the application. The application may be received as an application data message. For example, the application data message may be generated at a processing system of the UE device which handles the application and communicated to a radio circuit of the UE device for transmission to the network. Generally, the data is data to be transmitted from the application and the UE device on an uplink to the mobility network. During the sleep mode of CDRX, the transmitter and receiver are powered down but applications operating on the UE device continue to function and process data. Such data is encountered for processing at time 216.

Because the UE device is in the sleep mode 214 at the time 216 when data is available for processing, the UE device remains in the CDRX sleep mode until after the offset time 210 of the second CDRX cycle 206. At that time, the UE device leaves the sleep mode and returns to active mode. At time 220, the processed data received at time 216 may be handled by the radio of the UE device, for example by transmitting data on the uplink during the active mode 212 that begins following the offset time 210. Following the transmission or reception activity at time 220, and after an inactivity time 220, the UE device returns to sleep mode.

As illustrated in the example of FIG. 2B, a time delay 218 is introduced because the application data to be transmitted was received during sleep mode of the CDRX cycle. A similar time delay 222 is introduced when application data is received at time 224 during the second CDRX cycle 206, and another similar time delay 226 is introduced when application data is received at time 228 during the third CDRX cycle 208. Each time delay at each CDRX schedule, including time delay 218, time delay 222 and time delay 226, contributes to an increase in latency for transmission of data from the UE device. This substantially reduces the ability of the UE device, operating conventionally as in FIG. 2B, to communicate URLLC data for an uplink service since URLLC services have short latency requirements.

When the application data receiving moments such as time 216, time 224 and time 228 fall into the middle of CDRX sleep mode, the data will be stored at a buffer or other suitable location until the current CRDX cycle ends. The application data is handled this way in conventional processing, no matter if the data is part of a delay sensitive message or a non-delay sensitive message. All data are regarded as U-plane data in lower layers of the OSI model, such as the physical layer, the data link layer, the network layer and the transport layer. The UE device only monitors C-plane PDCCH activities and wake-up commands on the C-plane. The UE device does not monitor U-plane messages that might cause the device to wake up from the CDRX sleep mode and process the U-plane message. The U-plane message will be stored in a buffer and will not be seen by the UE for processing and data transmission until the UE device wakes up from the CDRX sleep mode. Therefore, the delay time could extend up to the full CRDX sleep time, or up to a few hundred milliseconds in some instances, depending on different CDRX cycle configurations.

In other examples, extra delay or network latency could be introduced due to large bandwidth (BW) required for URLCC services which the network can't support. Still further, extra delay could be introduced due to network traffic congestion. Accordingly, a substantial improvement in data transmission has been found through the separation of control plane (CP) messages for delay-sensitive traffic and user plane (UP) messages for non-sensitive traffic in the application layer 200G in FIG. 2A. Such separation will allow the network to deliver delay-sensitive messages as a priority and to significantly improve E2E latency.

Figure 2C:
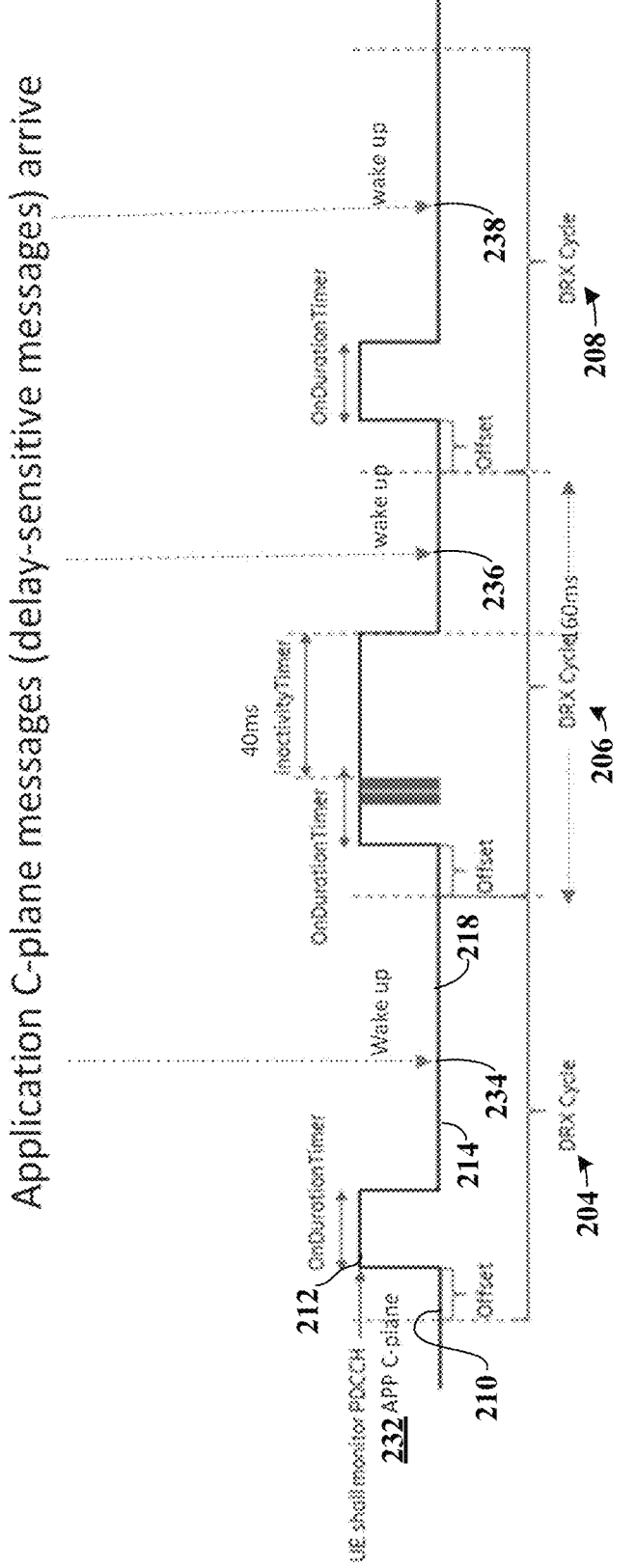
FIG. 2C is a block diagram illustrating an example of system timing for improved mobility network operating within the communication network of FIG. 1 in accordance with various aspects described herein.

FIG. 2C is a block diagram illustrating an example of UE device system timing 230 for improved mobility network operation within the communications network 125 of FIG. 1 in accordance with various aspects described herein. As noted, the sleep mode of CDRX is not a completely dormant state. The high-energy radio circuits are powered down to save battery level. However, the operating system of the UE device, including the processing system which controls operations and the application layer, remains energized and functional, even in a sleep mode such as the CDRX sleep mode.

In the example of FIG. 2C, the processing system of the UE device monitors the PDCCH downlink control channel as well as application data on the C-plane 232 from the application layer 200G (FIG. 2A) from applications operating on the UE device processing system. Such application data is defined to be control plane or C-plane data. In a system and method in accordance with various aspects described herein, application messages are separated or split into delay-sensitive messages on the one hand, and non-delay-sensitive messages on the other hand. The messages are then labeled as C-plane messages and U-plane messages. This labelling is similar to radio and core network C-plane and U-plane classification in a network such as communications network 125 (FIG. 1). Once a UE device receives a message on the application layer C-plane which is a delay-sensitive message, the UE device will wake up immediately even if the UE device is currently in the middle of a CDRX sleep mode.

The UE device monitors the PDCCH as in the system timing 202 of FIG. 2B, including responding to control plane information the PDCCH. In addition, in accordance with various aspects described herein, the UE device further monitors the C-plane of the application layer 200G. The control plane conveys C-plane messages and other information related to the functioning of any application operating on the processing system of the device. The monitoring of the C-plane data occurs during the CDRX sleep mode. As noted above, generally only the radio receiver and radio transmitter are powered down and enter sleep mode during the CDRX cycle. The remaining processing system, which implements and controls applications of the UE device, continue operating as normal.

If no data are detected on the C-plane of the application layer, operation continues as in FIG. 2B. The radio circuits are in sleep mode or active mode throughout the CDRX cycle, according to prescribed timing. However, if C-plane data is detected, such as at time 234, time 236 and time 238, the processing system fully wakes up from the CDRX sleep mode. The transmitter circuit, the receiver circuit and other radio circuits are energized to place them in active mode for communicating data with the network. The C-plane data detected by the UE processing system may include data on the PDCCH and data on the application layer of the processing system of the UE device. Thus, the application layer introduces an application layer wakeup signal that can interrupt the CDRX sleep mode. The CDRX sleep mode is interrupted, and data on the C-plane of the application layer, may be transmitted substantially immediately from the UE device. In some implementations, there may be a delay while the transmitter and the receiver of the UE device are energized for transmission and reception, but delays due to the sleep mode are substantially eliminated.

In this manner, the latency for responding to activity on the application layer is reduced to as little as 0 ms. When a message is received on the C-plane of the application layer, the UE device wakes up immediately and is ready to respond. If data for the uplink to be transmitted is data related to provision of a URLLC service by the UE device or at equipment related to the UE device, the transmission may begin essentially immediately, when the transmitter circuit and other radio equipment is configured to transmit.

In embodiments, application messages will be separated into two groups that produce different results. A C-plane group of messages has one characteristic and therefore should be processed immediately, by supplying the application layer wakeup signal to interrupt the CDRX sleep mode and prompt an immediate response. A U-plane group of messages has a second, related or converse characteristic and therefore does not need immediate processing.

In an example, C-plane messages are considered delay-sensitive messages and U-plane messages on the application layer C-plane are considered non-delay sensitive. Delay-sensitive messages are those that require an immediate response from the transmitter and receiver section of the UE device and operate to interrupt the CDRX sleep mode and prompt an immediate response. Non-delay sensitive messages are U-plane messages on the application layer that do not prompt an immediate response.

An application related to a URLLC service is an example of an application that may generate both delay-sensitive messages and non-delay sensitive messages on the application layer. In the example, the UE device may be used during provision or performance of URLLC services. For example, URLLC services may refer to using the mobile network for mission-critical applications that require uninterrupted and reliable data exchange. Short-packet data transmission may be used to meet both reliability and latency requirements of the wireless communication networks. Examples of URLLC services include public safety, telemedicine including remote diagnosis and treatment, emergency response, autonomous driving, industrial automation, and power transmission. Such examples may require latency on the order of 1 ms and 99.999% reliability. In such applications, the UE device may be embodied in or as part of medical equipment, industrial or manufacturing equipment, a vehicle, or any other suitable device requiring URLLC service in connection with its operation during provision of URLLC services.

For example, a UE device that provides URLLC data communication for a remote manufacturing equipment requires latency of 5 ms or less when controlling the manufacturing equipment. In the example, the manufacturing equipment is located remotely, such as overseas, relative to a manufacturing controller. Two types of communication may occur between the remote manufacturing equipment and the manufacturing controller. In a first, delay-sensitive communication, the controller transmits a control command to initiate or actuate an operation of the manufacturing equipment, such as to start operation, change direction, or stop operation. Because the device is being automatically controlled by the URLLC service, in real time, the device operations are delay-sensitive and control instructions must have very low latency. Communications from the application for the process, on the application layer 200G, are considered delay-sensitive.

On the other hand, some communications in this example are not delay-sensitive. One example is a request from the manufacturing controller for a non-urgent status such as a machine fluid level or a count of number of workpieces in process. Some reasonable degree of delay is acceptable in receiving or reporting this information, so communications related to the request are considered not delay-sensitive on the C-plane and application layer.

In another example, an autonomous vehicle operating in traffic includes a UE device to provide communications including URLLC service communications during the operation of the vehicle. The autonomous vehicle is controlled by one or more applications operating on an application layer of the processing system of the autonomous vehicle. The URLLC service communicates data with other autonomous vehicles in the vicinity, to coordinate safe interaction of the vehicles. In this example, delay-sensitive messages on the C-plane may include commands to steer, accelerate or brake the vehicle operating in traffic with other vehicles. Such operation requires near instantaneous response for safe operation and therefore requires very low latency, such as 2 ms. Other the other hand, non-delay-sensitive communications may relate to a battery level of the vehicle being reported by the vehicle on an uplink to a central station or navigation information being provided on the downlink to the vehicle. Such communications have relatively loose timing and time dependencies and therefore are not delay-sensitive.

Again, in the example if FIG. 2C, when a delay-sensitive instance occurs, and a delay-sensitive message is reported on the C-plane, the CDRX cycle of the UE device is interrupted so that the delay-sensitive message can be processed. Processing the delay-sensitive message may include transmitting data from the UE device, receiving data on a downlink at the device from the network, or some combination of transmission and reception. Processing the delay-sensitive message may further include taking some additional action specified for the delay-sensitive message.

Each application, in each operational circumstance, may have a predefined set of delay-sensitive messages and non-delay sensitive messages. The delay-sensitive messages may include those that require urgent processing and attention and response, and therefore require low latency, high reliability, high throughput, or other predefined handling. Examples include control messages and sensor data that must be processed urgently and accurately. In particular, the delay-sensitive messages require immediate wake up by the radio circuits and interruption of the CDRX cycle or other similar processes that might otherwise delay a response. The delay-sensitive messages thus forming a first group of messages have one common characteristic, urgency, and therefore should be processed immediately, by supplying the application layer wakeup signal to interrupt the CDRX sleep mode and prompt an immediate response.

Each application may further have a predefined set of non-delay-sensitive messages which includes those that do not require urgent processing. Examples include status requests and responses, background information transmission, etc. In particular, the non-delay-sensitive messages generally do not require immediate wake up by the radio circuits or interruption of the CDRX cycle or other similar processes. For these processes, some delay in response is acceptable. The non-delay sensitive messages thus form U-plane messages that has a second, related or converse characteristic, non-urgency, and therefore does not need immediate processing.

In addition to delay sensitivity, any other suitable characteristic or process may be defined into two or more groups that require complementary handling. For example, the UE device may be associated with equipment that provides telemedicine including remote diagnosis and treatment. An application running on the equipment generates messages related to a patient's vital statistics such as blood pressure, heart rate and respiration rate. A second application provides feedback about the treatment being given to the patient, such as amounts of particular drugs dispensed. Both applications share data on an application layer of the equipment and communicate groups of application messages on a C-plane of the equipment. Neither group of messages is considered urgent or delay-sensitive. However, the patient statistics may be grouped together and designated as messages that will immediately interrupt the CDRX cycle of the UE device. The drug feedback messages may be grouped separately and designated as messages that will prompt a response upon normal operation of the CDRX cycle, such as when CDRX timing causes the UE device to fully wake up, receive a downlink and provide uplink data.

Moreover, in addition to interaction with the CDRX cycle, any other suitable action may be specified for respective groups of messages or application layer data. For example, instead of transmitting information contained in the drug feedback messages, such information may be stored locally at the medical equipment or at the UE device. Upon storage, the information is available to be provided in response to a request from a remote controller.

Moreover, commands, messages and data that appear on the C-plane may be stored in a library or lookup table by a user and assigned a particular handling procedure or status. Thus, in the example of the autonomous vehicle, a user or designer may designate all vehicle control commands for delay-sensitive processing and may further designate all status reporting commands as non-delay sensitive. When a command in the library is encountered on the C-plane, the command is handled as specified in the library or lookup table. In some examples, the user may subsequently add commands or data or messages to the library, or remove them from the library, or redesignate them within the library. Thus, a command to report a battery depletion status of the vehicle may be shifted from non-delay sensitive to delay-sensitive if it is determined that this parameter is important to operation. Further, handling as delay-sensitive or non-sensitive handling may be made conditional and depend on status of a defined condition. In an example, the command to report the battery depletion status of the vehicle may be non-delay sensitive if the battery level is above 25% but may be redesignated as delay-sensitive when the battery level is 25% or below.

Figure 2D:
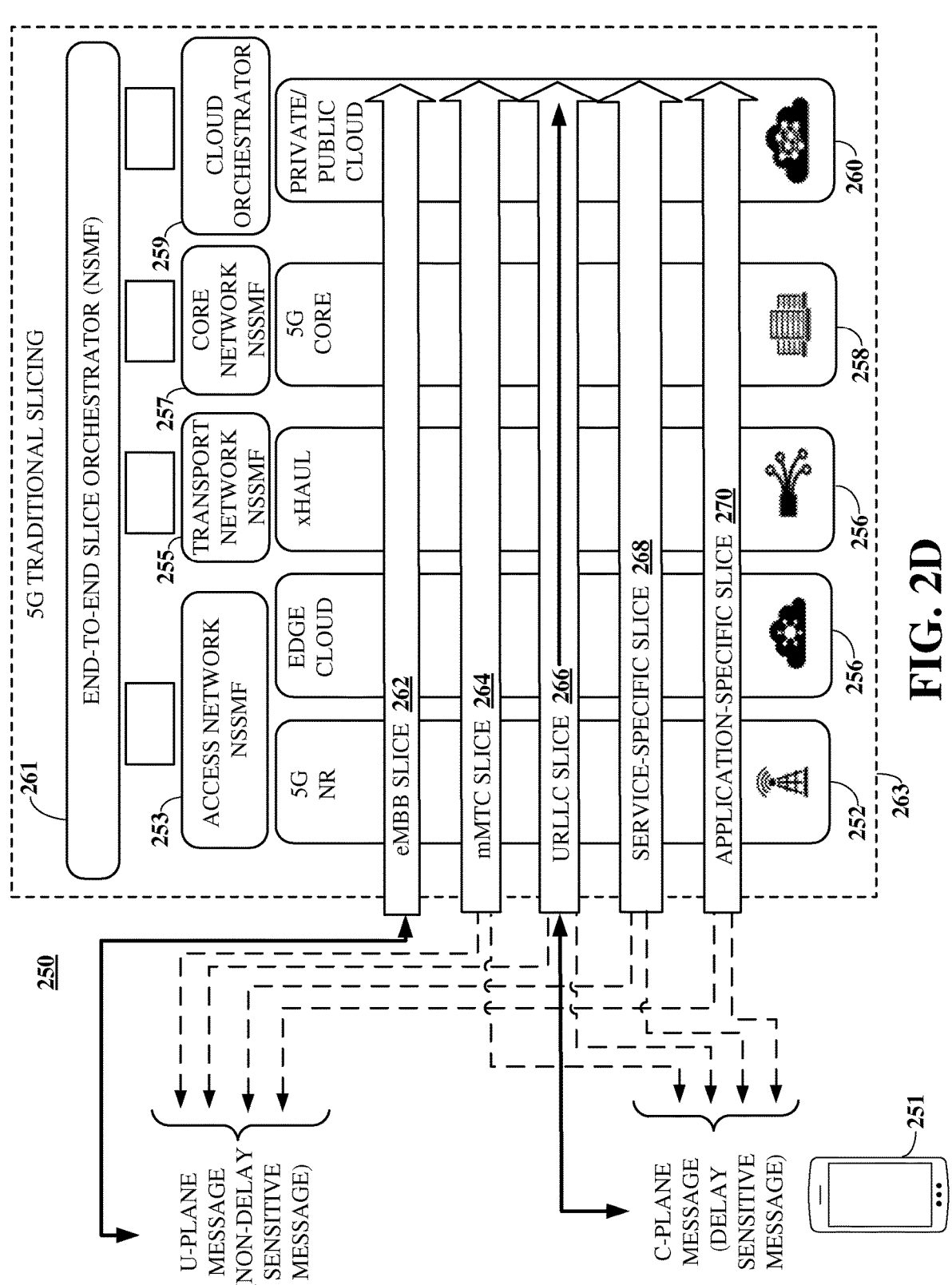
FIG. 2D is a block diagram illustrating a network slice organization in an improved mobility network operating within the communication network of FIG. 1 in accordance with various aspects described herein.

FIG. 2D is a block diagram illustrating a network slice organization 250 in an improved mobility network operating within the communication network of FIG. 1 in accordance with various aspects described herein. The network slice organization 250 enables communication between a user equipment (UE) device 251 and a mobility network 263. The mobility network 263 includes several functional components, including an air interface network 252, an edge cloud network 254, a backhaul network 256A, and a core network 258. The core network 258 enables communication access between the mobility network 263 and one or more networks such as private or public cloud networks like the public internet 260. The network slice organization operates under control of a network slice orchestrator 261, operating as a network slice management function (NSMF). The air interface network 252 and the edge cloud network 254 operate in conjunction with an access network slice subnet management function (SSMF). The backhaul network 256 operates in conjunction with a transport network NSSMF. The core network 258 operates in conjunction with a core network NSSMF 257 The public internet 260 is engaged by the mobility network 263 through a cloud orchestrator 259. The arrangement of FIG. 2D is intended to be exemplary only. Other configurations may be used instead or in addition.

Further in the example, communications among the devices of the mobility network 263 are segregated among a number of network slices. The network slices include an enhanced mobile broadband (eMBB) slice 262, a massive machine type communication (mMTC) slice 264, an ultra-reliable low latency communication (URLLC) slice 266, a service-specific slice 268, and an application specific slice 270. The arrangement is exemplary only. Other configurations may be used instead or in addition. Moreover, the slices may be software-defined according to particular network requirements at a given time.

The UE device 251 may be any suitable device operating in radio communication with the mobility network 263. For example, the UE device 251 may be a mobile communication device operable to communication in accordance with an air interface standard with radio equipment of the mobility network. In another example, the UE device 251 is part of, an element of, or operates in conjunction with an associated device which performs some application, such an autonomous vehicle, manufacturing equipment, a medical device, and others.

Every application operating on a device such as the UE device 251 or an associated device communicates data with the mobility network 263. Every application operates according to a portion of each slice, including the eMBB slice 262, the mMTC slice 264, the URLLC slice 266, the service-specific slice 268 and the application specific slice 270.

Conventionally, 3GPP specifications for URLLC services dictate a very conservative modulation and coding scheme, MCS of 0, for radio link adaptation in order to avoid delays caused by potential retransmission in the absence of feedback from the UE. The MCS specifies a modulation type and a code rate for the uplink and is generally dependent on radio link quality. MCS of 0 or channel quality indicator equaling 0 corresponds to very conservative setting for a poor-quality channel. Higher MCS values provide better throughput, or amount of information communicated per unit of time. As a result, URLLC services are relatively expensive to provide, in terms of radio resources such as spectral efficiency. Because of the 3GPP requirements, the URLLC services require a fixed grant using the lowest MCS value, or 0, and lowest throughput. This applies for end-to-end communications, from the UE device 251 through all the slices of the network slice organization 250. Currently, the only way to increase throughput is to provide a bigger pipe, or a physical connection with higher throughput.

In accordance with various aspects described herein, communications from applications operating on the UE device 251 are separated according to delay sensitivity. Substantially all delay-sensitive communications or messages are assigned to the control plane or C-plane of the UE device 251 and are routed to the URLLC slice 266. Non-delay sensitive communications or messages may be routed conventionally, among the different slices according to priority and traffic levels. In some embodiments, substantially all non-delay-sensitive communications or messages are assigned to the eMBB slice 262. In this option, information on the eMBB slice 262 generally does not have a delay sensitivity. To reduce delay on the eMBB slice 262, the bandwidth or throughput associated with the eMBB slice 262 may be increased to create a larger pipe. In other examples, any other factor, in addition to or instead of delay sensitivity may be used to select between routing to the URLLC slice 266.

Figure 2E:
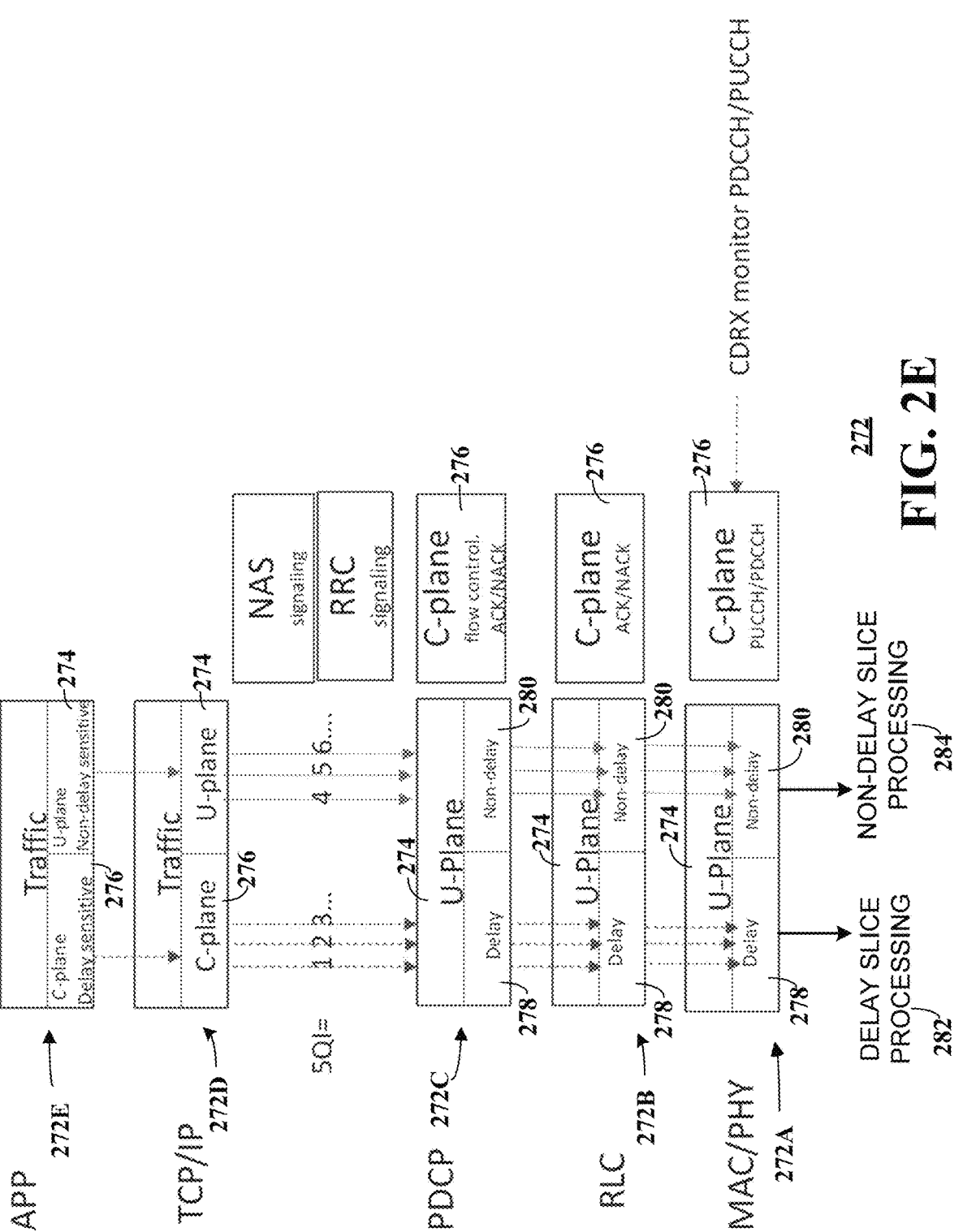
FIG. 2E is a block diagram illustrating interactions between layers of the TCP/IP model of FIG. 2A in an improved mobility network in accordance with various aspects described herein.

FIG. 2E is a block diagram illustrating interactions between layers of the OSI model 272 in an improved mobility network in accordance with various aspects described herein. The OSI model 272 includes, for example, a MAC/PHY layer 272A, a radio link control (RLC) layer 272B, a packet data convergence protocol (PDCP) layer 272C, a TCP/IP layer 272D, and an application layer 272E.

The 3GPP specification clearly defines a separation between the U-plane 274 and the C-plane 276 in the bottom three layers, including the MAC/PHY layer 272A, the RLC layer 272B and the PDCP layer 272C. 5G introduced the C-plane and the U-plane in TCP/IP layers. The network and transport layer 272D and the application layer 272E do not include a separation of C-plane and U-plane traffic. All traffic is treated by the lower three layers, the MAC/PHY layer 272A, the RLC layer 272B and the PDCP layer 272C, as U-plane traffic. In 4G, traffic is divided into control plane (C-plane) and user plane (U-plane) up to the PDCP layer. In 5G, TCP/IP traffic is split into two groups, C-plane and U-plane, to address significant delays during the TCP data session setup, modification and release processes. In accordance with certain aspects described herein, the concept of the C-plane and the U-plane separation are extended up to the application layer.

In accordance with various aspects described herein, the traffic in the application layer 272E and the TCP/IP layer 272 is modified to be defined as C-plane traffic and U-plane traffic. In the example, traffic which is identified as delay-sensitive traffic is designated as C-plane traffic. Further in the example, traffic which is identified as non-delay-sensitive traffic is designated as U-plane traffic. Further, all delay-sensitive traffic on the C-plane 276 of the application layer 272E and the TCP/IP layer 272D is collectively treated as delay-sensitive traffic and handled as a group according to the slicing construct of FIG. 2D. The delay-sensitive traffic is given consistent delay slice processing 282 throughout the network slice organization 250 of FIG. 2D. Similarly, all non-delay-sensitive traffic on the U-plane 274 of the application layer 272E and the TCP/IP layer 272D is collectively treated as non-delay-sensitive traffic and handled as a group according to the slicing construct of FIG. 2D. The delay-sensitive traffic is given consistent non-delay slice processing 284 throughout the network slice organization 250 of FIG. 2D. As illustrated in FIG. 2D and FIG. 2E, the slicing construct effectively splits application layer traffic into two groups, including URLLC traffic on the URLLC slice 266 for C-plane traffic and eMBB traffic on the eMBB slice 262 for U-plane traffic.

The illustrated system and method operate to transport what is designated as C-plane 276 traffic on the application layer 272E onto the URLLC slice 266. That traffic handling provides the lower latency that is desired. As noted, in the example, traffic is designated as delay-sensitive and non-delay sensitive traffic. In other examples, other designations or distinctions could be used to control routing first selected traffic to the C-plane and second selected traffic to the U-plane for different processing and to provide different performance advantages.

In this manner, the new definitions of delay-sensitive and non-delay sensitive traffic on the application layer may be handled conventionally by the lower layers, without having to change definitions or processing of traffic on the lower layers. The UE device 251 and the rest of the network will treat the two types of traffic differently and provide the different performance characteristics described herein, all within the definitions of current 3GPP devices and procedures.

In this context, delay-sensitive messages are those that require an immediate communication between the UE device 251 and the mobility network 263. Such messages may prompt an immediate response, such as by interrupting the CDRX sleep mode. Non-delay sensitive messages are messages that are not urgent and do not require immediate communication. Non-delay-sensitive messages may be routed on the U-plane. Routing the delay-sensitive messages on the C-plane of the application layer 200G ensures rapid communication for the data of these messages and may assist to reduce latency for latency-sensitive applications such as URLLC services.

A message, a communication, data or any other information may be designated as delay-sensitive in any suitable manner. In a first example, a designer or developer of an application may designate some communications as delay-sensitive and others as non-delay sensitive. Thus, the designer may designate communications related to control of a remote device, that require immediacy or very low latency, as delay-sensitive, and designate reporting or status communications as non-delay sensitive. As the application operates, the application may consult a library of commands or communications or a lookup table or other similar resource for the status or designation of the communication. Based on the status as delay-sensitive or non-delay sensitive, the application will handle the communication accordingly. Thus, the delay-sensitive communication will be processed on the C-plane and, in the example of FIG. 2D, be routed to the URLLC slice for rapid communication. Similarly, the non-delay sensitive communication will be processed on the U-plan and routed with other application traffic on an application specific slice 270, for example. In another example, the non-delay sensitive communication will be routed on the eMBB slice 262 with other data traffic.

In another example, the UE device 251 may include an artificial intelligence (AI) module or a machine learning model (ML model) for deciding if a communication is a delay-sensitive communication or a non-delay sensitive communication. The AI module or ML model may be formed from hardware, software or some combination of these. The AI module or the ML model may be located at the UE device, at network equipment in communication with the UE device or a combination of these. In some applications or usages, it is unknown what messages are classified as delay-sensitive messages and what messages should be classified as non-delay-sensitive messages. Such knowledge or awareness may only be developed through actual experience of communicating the message and learning the effect on latency or other key performance indicators.

The AI module or ML model may receive information about past designation of data or messages or commands as delay-sensitive or non-delay sensitive, as well as information about communication of such data or messages or commands. The information about communication may include measured or estimated latency values for the communication, information about data throughput or any other key performance indicator, information about a bit error rate or other reliability measure, or any other information. In some examples, the information about communication and information about past designation may be used as training data for a machine learning model. The AI module or ML model may be used to provide an estimate of whether a messages may be moved from the delay-sensitive category to the non-delay sensitive category illustrated in Table 1.

In some embodiments, the AI module or ML model may operate to update and modify the classifications of commands or traffic types illustrated in Table 1. This may be done on an application-by-application basis. For example, the AI module or ML model may have access to accumulated data from many instances of an application such as the V2X application. Based on a large number of experiences collected in the accumulated data, the AI module or the ML model can predict whether a particular message, class of messages or other information or grouping of information is likely to be delay-sensitive or non-delay sensitive. The AI module or ML model can pre-populate a table such as Table 1 or otherwise predefine or designate the particular message, class of messages or other information accordingly.

Based on further accumulated experience, including experience for this particular application for this particular UE device for this particular user, a particular command or message may be recategorized or moved in a table such as Table 1. This updating process may continue over time, under control of the ML model, AI module, or other source. The updating may reflect changing network conditions, changing usage patterns by a user or any other factors.

TABLE 1

| Application | V2X | Cloud-gaming | tele-medical | Remote manufacturing | Live Video |
|---|---|---|---|---|---|
| C-plane delay sensitive | Collison detection stop start change directions | Actions commands | surgery operation | actions for operation | I-frame |
| U-plane non-delay sensitive | GPS position Map and service info engine info collection monitoring | Video Audio | diagnostics | data collection surveillance maintained data upgrading | P-frame | particular message or command or data on the application layer of the UE device is delay-sensitive or non-delay-sensitive.

However, some message types or particular messages may be predefined as delay-sensitive or non-delay sensitive, or otherwise as critical or non-critical. Table 1 indicates various types of applications that may be considered for this processing including vehicle-to-everything (V2X) applications, cloud gaming applications, telemedicine applications, remote manufacturing applications and live video. Other applications may be considered as well.

For each application, certain functions or messages may be predefined or designated as delay-sensitive. For example, for V2X applications, traffic related to collision detection, stopping the vehicle, starting the vehicle and directing the vehicle may be initially designated as delay sensitive or critical applications. Accordingly, traffic related to those operations is designated for treatment as C-plane traffic. Similarly, for V2X applications, data traffic related to Global Positioning System (GPS) data and mapping functions are not time-sensitive, or at least not critically time sensitive. Accordingly, the traffic for these functions can be designated and predefined as U-plane traffic. Similar treatment can be provided for other applications as well.

Figure 2F:
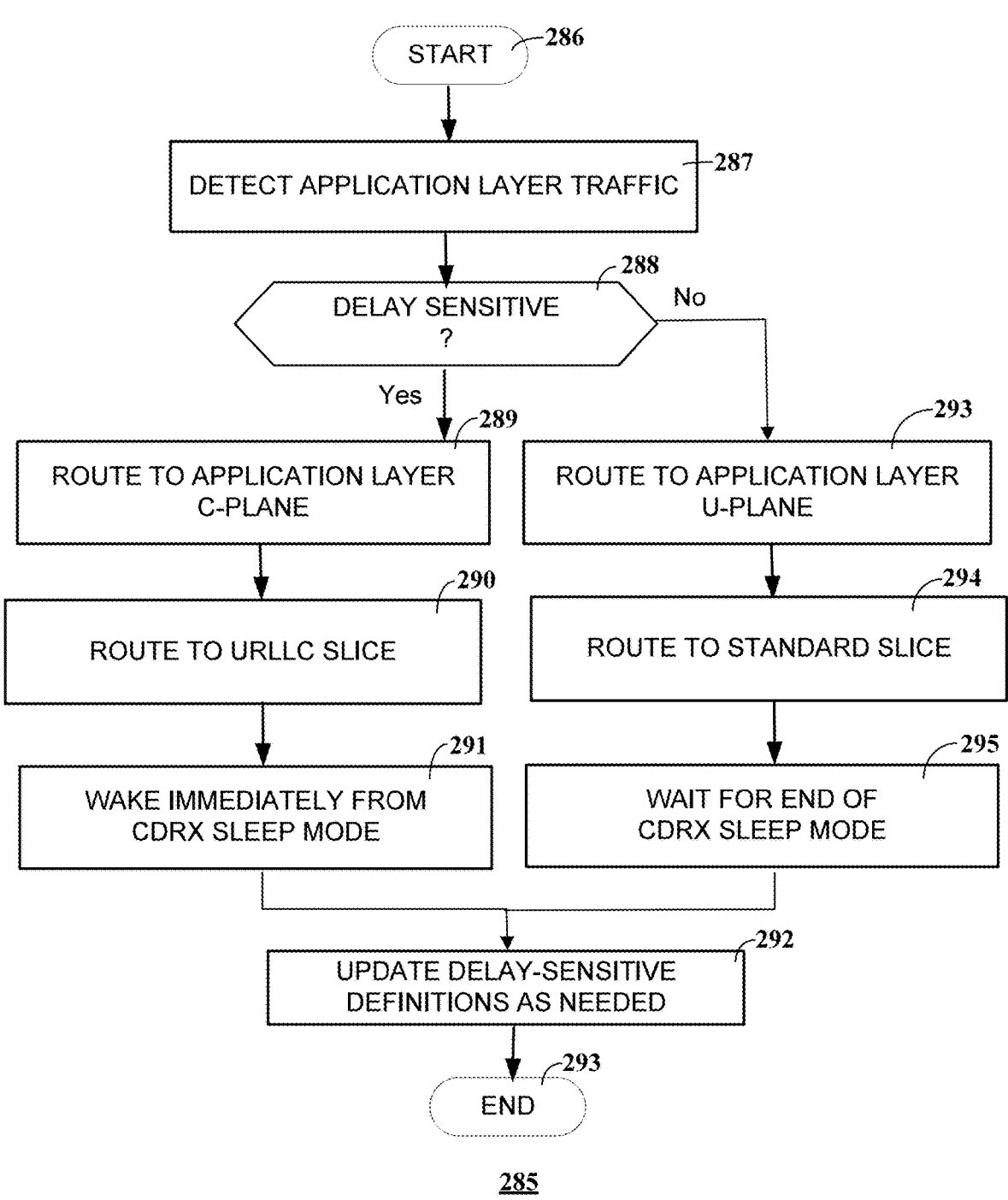
FIG. 2F depicts an illustrative embodiment of a method in accordance with various aspects described herein.

Moreover, with experience with the application in a real-world environment, particular traffic or commands or FIG. 2F depicts an illustrative embodiment of a method 285 in accordance with various aspects described herein. Method 285 may be performed at any suitable device in a communication network such as the communications network 125 of FIG. 1. In an example, the method 285 may be performed at a UE device such as UE device 251 of FIG. 2D. Further, the method 285 may be embodied as executable instructions that, when executed by a processing system including a processor, facilitate the performance of operations such as those illustrated in FIG. 2F. The method 285 begins at step 286.

At step 287, the method 285 includes detecting application-layer traffic at a communication device such as the UE device 251 of FIG. 2D. Application layer traffic may be any traffic generated by an application operating on or in conjunction with an application at the communication device. In an example, the application may pertain to operating an autonomous vehicle and providing communication to the autonomous vehicle. And a further example, the application may be running on a component of medical equipment. The communication device is part of or associated with the component of medical equipment. The application layer traffic may be generated, for example, by an actuation of the communication device or associated equipment by a user, or by operation of the application running on the communication device or the associated equipment. In general, at step 287, information is generated which should be communicated to a remote location over an uplink from the communication device.

At step 288, the method 285 determines if the application layer traffic is delay sensitive. This determination may be made in any suitable manner. In the first example, the application layer traffic may be related to a command specified by a user of the communication device. The method 285 at step 288 may operate to look up the command in a lookup table or library or other stored source of information. Based on information retrieved, step 288 may conclude that the particular traffic is delay sensitive. Alternatively, step 288 may conclude that the particular traffic is not delay sensitive. In a further example, an artificial intelligence module or a machine learning model may operate automatically to monitor the application layer traffic of the communication device. Based on training data and other information available to the artificial intelligence module or the machine learning model, the artificial intelligence module or the machine learning module make include that the application layer traffic is delay sensitive or is not delay sensitive. And the other suitable technique for determining criticality of the application layer traffic may be used.

At step 289, if the application layer traffic was determined to be delay sensitive, the application layer traffic is routed to a control plane or C-plane of the application layer. The control plane generally handles control functions and is generally given higher priority in processing during communications. In particular, the control plane information is processed with lower latency than user claim information on the application layer.

Add step 290, the method 285 includes routing the delay sensitive application layer traffic to a network slice for lowest latency processing. In the illustrated example, the network slice dedicated to ultra reliability low latency communications (URLLC) is used for routing the application layer traffic. In some examples, particular communication parameters may be modified. For example, in 5G mobility networks, URLLLC communication generally is limited to a very conservative modulation and coding scheme (MCS) value of zero. In some instances, the MCS value may be changed to a less conservative, higher throughput value.

Add step 291, if the communication device is in a low power sleep mode, such as a CDRX sleep mode, the method 285 operates to immediately wake the communication device from the low power sleep mode for processing of the application layer traffic. Processing of the application layer traffic may include communicating information related to the traffic on an uplink from the communication device to a mobility network element such as a base station.

If, at step 288, it was determined that the application layer traffic is not delay sensitive, at step 293, the non-delay sensitive application layer traffic is routed to the user plane (U-plane) of the application layer for further processing. The user plane is generally used for traffic generated by an application or by a user of an application. The user playing conveys user data.

At step 294, the non-delay sensitive application layer traffic is routed to a standard slice of the mobility network. The standard slice may be an application specific slice such as application specific slice 270 in FIG. 2D. The application specific slice may include network devices and services which are dedicated to handling traffic from the application operating on the UE device or other communications device. In general, the application specific slice will process the non-delay sensitive application layer traffic according to standard processing, with standard latency values. In some applications, the non-delay sensitive application layer traffic may be processed on a dedicated slice, such as the eMBB slice 262 of FIG. 2D.

At step 295, if the communication device is operating in a low power sleep mode, such as the CDRX sleep mode, the non-delay sensitive application layer data traffic awaits the end of the sleep mode or sleep cycle of the communication device. At the end of the sleep mode, uplink transmission including the non-delay sensitive application layer traffic is transmitted from the communication device according to normal timing.

At step 292, it is determined if the delay-sensitive definitions for delay sensitive traffic should be updated. For example, based on experience with a volume of traffic over a designated time period, it may be determined that a type of traffic or a message or a command initially defined as delay sensitive may be moved or redesignated instead to being non-delay sensitive. Alternatively, a formerly non-delay sensitive traffic element may be determined to be better handled as delay sensitive. The updating definitions process of step 292 may be done in any suitable manner, such as updating lookup tables or library definitions. In embodiments using an artificial intelligence module or a machine learning model, those modules or models may be updated based on the updated information. Alternatively, an artificial intelligence module and a machine learning model may be automatically updated, for example, based on newly received training data. The method ends at step 293.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
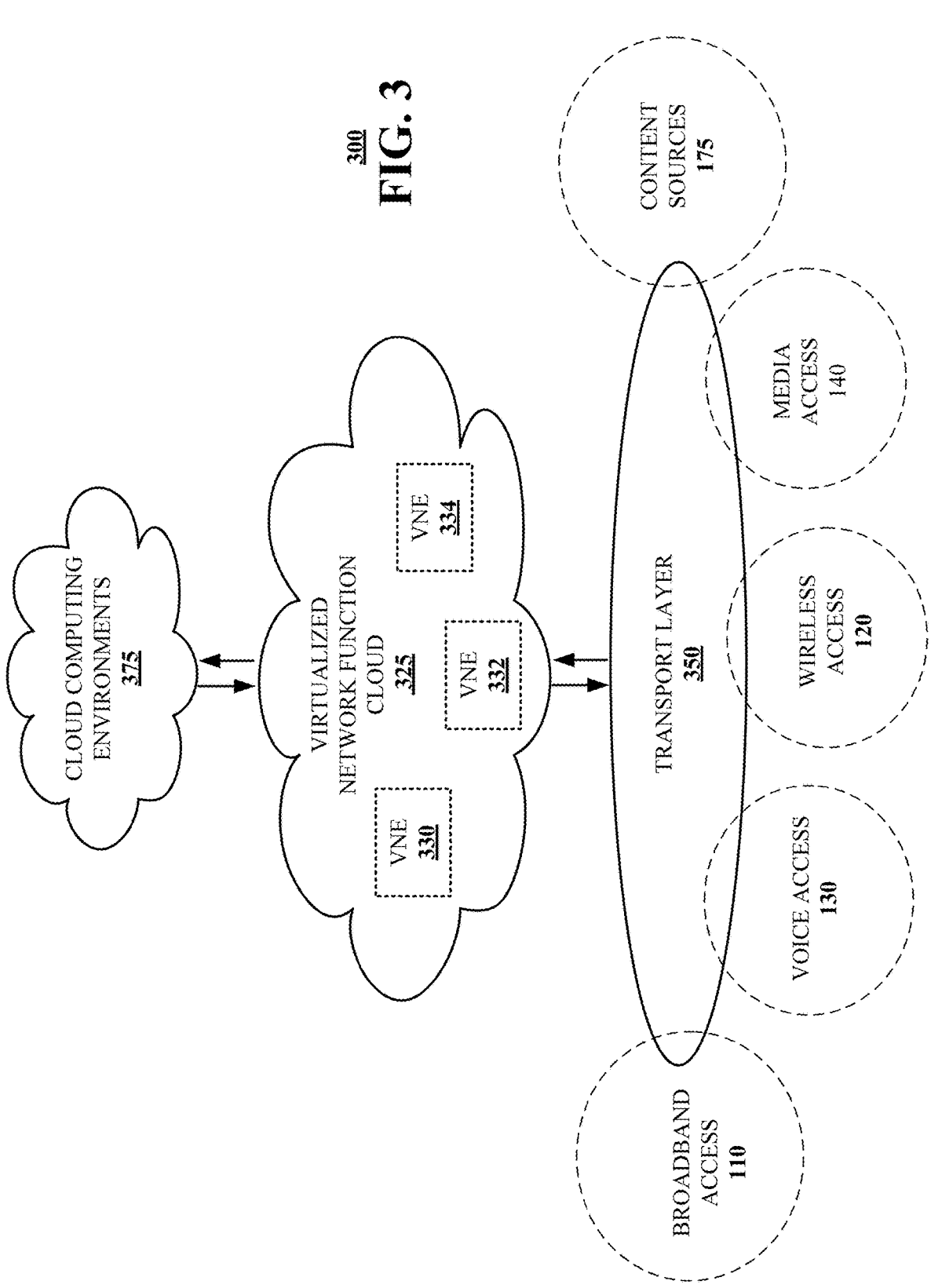
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100 and method 285 presented in FIG. 1, FIG. 2A, FIG. 2B, FIG. 2C, FIG. 2D, FIG. 2E FIG. 2F and FIG. 3. For example, virtualized communication network 300 can facilitate in whole or in part assigning application layer traffic in a communication device to a control plane or a user plane of the application layer. The control plane traffic is communicated promptly to reduce latency of communications by the communication device with components of the virtualized communication network 300.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
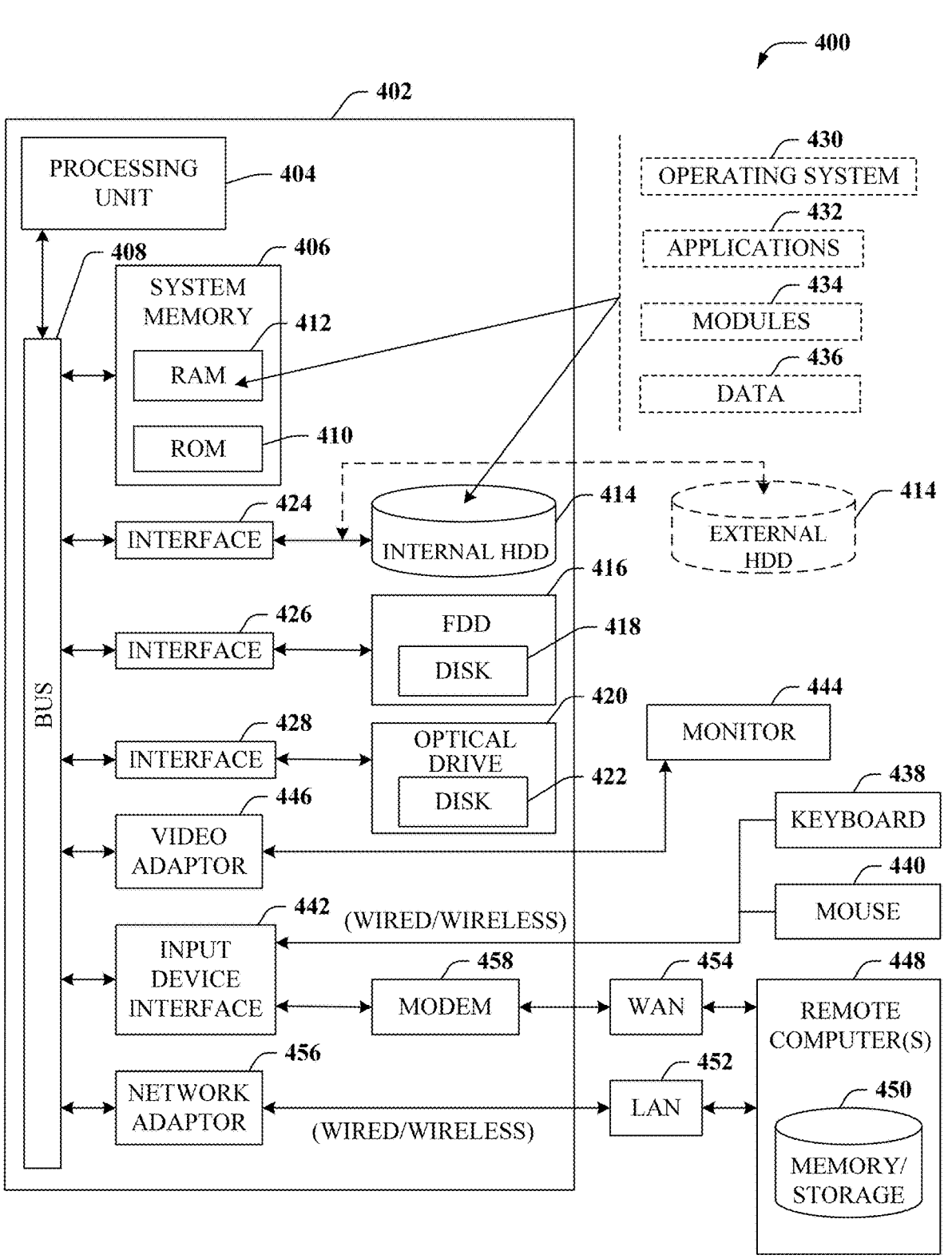
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part assigning application layer traffic in a communication device to a control plane or a user plane of the application layer. The control plane traffic is communicated promptly to reduce latency of communications by the communication device which includes one or more embodiments of the computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD)

416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
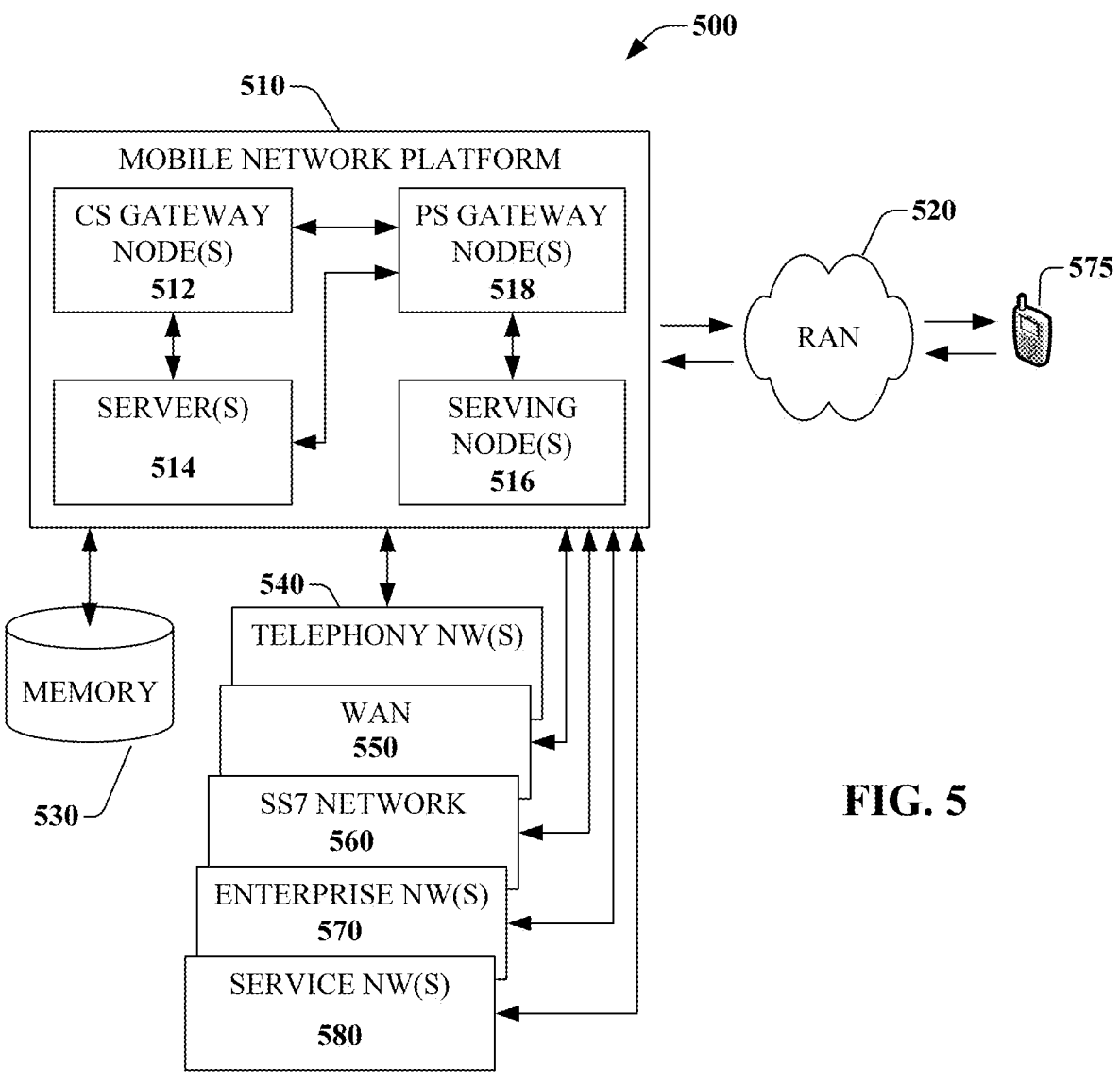
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part assigning application layer traffic in a communication device such as radiotelephone 575 to a control plane or a user plane of the application layer. The control plane traffic is communicated promptly to reduce latency of communications by the communication device with other elements of the mobile network platform 510. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
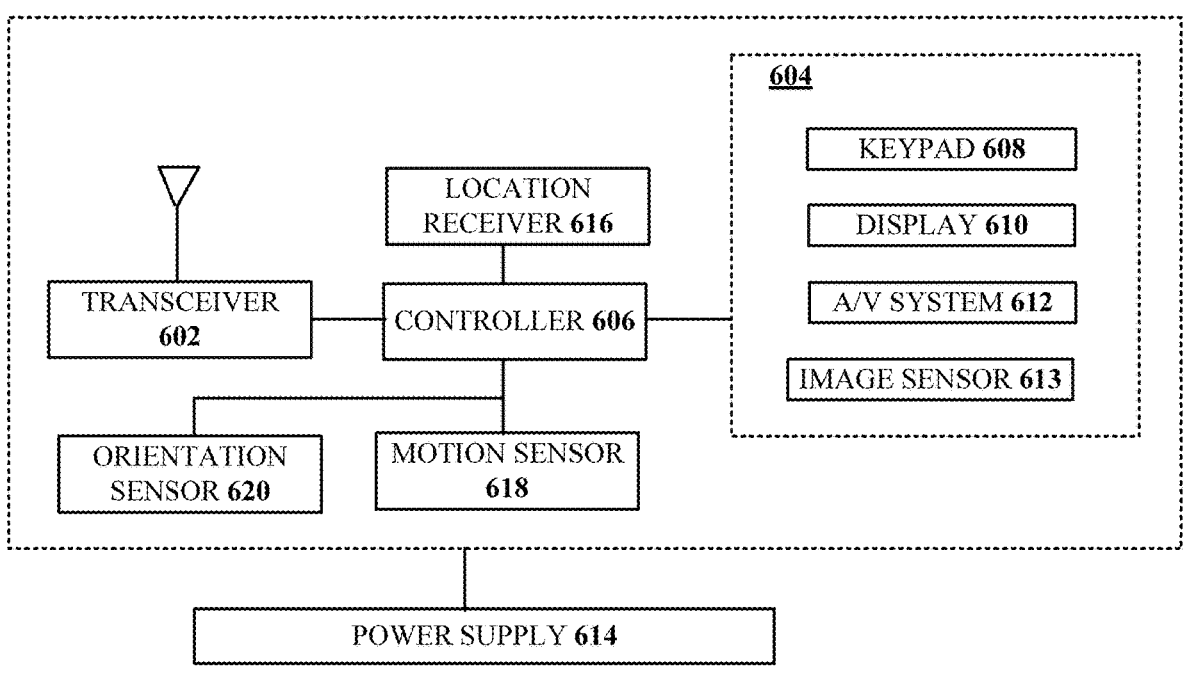
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part assigning application layer traffic in the communication device such as to a control plane or a user plane of the application layer. The control plane traffic is communicated promptly to reduce latency of communications by the communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

detecting data traffic on an application layer of a communication device;

determining if the data traffic is delay-sensitive data traffic, wherein the determining if the data traffic is the delay-sensitive data traffic comprises:

retrieving, from a library, information about one or more designated handling procedures for the data traffic, and assigning the data traffic as one of the delay-sensitive data traffic or non-delay sensitive data traffic based on the one or more designated handling procedures;

routing the data traffic to a control plane of the application layer, wherein the routing the data traffic to the control plane is responsive to a determination that the data traffic is the delay-sensitive data traffic;

communicating the data traffic on the control plane over a wireless connection to a remote device according to system timing for control plane traffic; and updating the library responsive to user input about the one or more designated handling procedures for future data traffic on the application layer of the communication device, wherein the updating the library comprises:

adding commands or data to the library, including adding a respective designated handling procedure for the commands or data, deleting old commands or old data from the library, and for an existing command designated as one of delay-sensitive data traffic and non-delay sensitive data traffic, redesignating the existing command as the other of the delay-sensitive data traffic and the non-delay sensitive data traffic.

2. The device of claim 1, wherein the operations further comprise:

routing the data traffic on a user plane of the application layer of the communication device, wherein the routing the data traffic on the user plane is responsive to a determination that the data traffic is the non-delay sensitive data traffic; and communicating the data traffic on the user plane over the wireless connection to the remote device according to system timing for user plane traffic.

3. The device of claim 1, wherein the one or more designated handling procedures in the library is conditionally selected based on a context parameter, the context parameter comprising at least one of a battery level of the communication device, a measured or estimated latency value associated with prior communications of the communication device, or an application type associated with an application generating the data traffic.

4. The device of claim 1, wherein the operations further comprise:

identifying the data traffic on the application layer of the communication device;

identifying the data traffic as a command associated with an application operating on the communication device; and determining, from the library, the one or more designated handling procedures for the command associated with the application.

5. The device of claim 1, wherein the operations further comprise:

responsive to determining that the data traffic is the delay-sensitive data traffic, routing the data traffic to a first network slice associated with ultra-reliable low latency communications (URLLLC).

6. The device of claim 1, wherein the operations further comprise:

responsive to determining that the data traffic is the delay-sensitive data traffic, generating an application-layer wakeup signal; and providing the application-layer wakeup signal to a radio circuit.

7. The device of claim 1, wherein the determining if the data traffic is delay-sensitive data traffic comprises:

receiving, from an artificial intelligence module or a machine learning model, information about the one or more designated handling procedures for the data traffic; and assigning the data traffic as one of the delay-sensitive data traffic or the non-delay sensitive data traffic based on the one or more designated handling procedures.

8. The device of claim 1, wherein the operations further comprise:

entering an active mode from a sleep mode of a discontinuous reception operation of the communication device, wherein the entering the active mode from the sleep mode is responsive to a presence of the data traffic to the control plane of the application layer; and communicating the data traffic on the control plane over the wireless connection substantially immediately upon entering the active mode to reduce latency of wireless communications between the communication device and the remote device.

9. The device of claim 8, wherein the operations further comprise:

remaining in the sleep mode of the discontinuous reception operation of the communication device, wherein the remaining in the sleep mode is responsive to the presence of the data traffic on a user plane of the application layer of the communication device; and communicating the data traffic on the user plane over the wireless connection to the remote device upon exit from the sleep mode to the active mode of the discontinuous reception operation according to normal timing of the discontinuous reception operation.

10. The device of claim 8, wherein the operations further comprise:

receiving an application layer wakeup signal, wherein the application layer wakeup signal is generated by the processing system in response to the presence of the data traffic to the control plane of the application layer; and entering the active mode from the sleep mode of the discontinuous reception operation of the communication device in response to the receiving the application layer wakeup signal.

11. A non-transitory machine-readable medium, comprising executable instructions that, when executed by a processing system including a processor, facilitate performance of operations, the operations comprising:

receiving an input to an application operating on the processing system;

generating data traffic responsive to the input;

communicating the data traffic on an application layer of the processing system;

determining if the data traffic is delay-sensitive data traffic, wherein the determining if the data traffic is the delay-sensitive data traffic comprises:

looking up, in a storage location, information about a designated handling procedure for the data traffic, and assigning the data traffic as the delay-sensitive data traffic based on the designated handling procedure;

assigning the data traffic on a control plane of the application layer, wherein the assigning the data traffic on the control plane is responsive to the determining the data traffic is the delay-sensitive data traffic;

communicating the data traffic on the control plane to a radio circuit for communication by the radio circuit over a wireless connection to a remote device, the radio circuit communicating the data traffic in response to the assigning the data traffic on the control plane of the application layer, to reduce latency of wireless communications between the radio circuit and the remote device; and updating the information responsive to user input about the designated handling procedure for future data traffic on the application layer, wherein the updating of the information comprises:

adding commands or data to the information, deleting old commands or old data from the information, and redesignating an existing command as being associated with the delay-sensitive data traffic.

12. The non-transitory machine-readable medium of claim 11, wherein the operations further comprise:

determining if the data traffic is non-delay-sensitive data traffic;

assigning the data traffic on a user plane of the application layer, wherein the assigning the data traffic on the user plane is responsive to the determining the data traffic is the non-delay-sensitive data traffic; and communicating the data traffic on the user plane to the radio circuit for communication by the radio circuit over the wireless connection.

13. The non-transitory machine-readable medium of claim 12, wherein the operations further comprise:

responsive to determining that the data traffic is the delay-sensitive data traffic, routing the data traffic to a first network slice associated with ultra-reliable low latency communications (URLLLC).

14. The non-transitory machine-readable medium of claim 12, wherein the determining if the data traffic is delay-sensitive data traffic comprises:

receiving, from an artificial intelligence module, the information about athe designated handling procedure for the data traffic; and assigning the data traffic as one of the delay-sensitive data traffic or the non-delay sensitive data traffic based on the designated handling procedure.

15. The non-transitory machine-readable medium of claim 11, wherein the operations further comprise:

responsive to the data traffic on the control plane, entering an active mode from a sleep mode of a discontinuous reception operation of the radio circuit, wherein the entering the active mode comprises energizing the radio circuit; and communicating the data traffic on the control plane to the radio circuit for communication by the radio circuit over a wireless connection.

16. The non-transitory machine-readable medium of claim 11, wherein the operations further comprise:

separating communications of all data traffic on the application layer according to a determination that the data traffic is the delay-sensitive data traffic;

communicating delay-sensitive messages on the control plane of the application layer; and communicating non-delay sensitive messages on a user plane of the application layer.

17. A method, comprising:

detecting, by a processing system including a processor, data traffic on an application layer of a communication device, the data traffic including delay-sensitive messages and non-delay sensitive messages;

identifying, by the processing system, the data traffic as the delay-sensitive messages or the non-delay sensitive messages, wherein the identifying of the data traffic as the delay-sensitive messages or the non-delay sensitive messages comprises:

identifying the data traffic as the delay-sensitive messages or the non-delay sensitive messages based on information about a designated handling procedure;

routing, by the processing system, the delay-sensitive messages to a control plane of the application layer;

routing, by the processing system, the non-delay sensitive messages to a user plane of the application layer;

communicating, by the processing system, the delay-sensitive messages on the control plane to reduce latency of wireless communications between the communication device and a remote device; and updating the information responsive to user input about the designated handling procedure for future data traffic on the application layer, wherein the updating of the information comprises:

adding commands or data to the information, deleting old commands or old data from the information, and redesignating an existing command as being associated with the delay-sensitive data traffic.

18. The method of claim 17, comprising:

communicating, by the processing system, the non-delay sensitive data traffic on the user plane to the remote device according to normal system timing for user plane traffic.

19. The method of claim 18, wherein the identifying the data traffic as either the delay-sensitive data traffic or the non-delay sensitive data traffic comprises:

receiving, by the processing system, a message from an application operating on the processing system of the communication device; and retrieving, by the processing system, from a local resource, the information about the designated handling procedure for the message, wherein the information is based on the message being the delay-sensitive message or the non-delay sensitive message.

20. The method of claim 17, comprising:

transitioning, by the processing system, a radio circuit of the communication device from a low-power sleep mode to an active mode, wherein the transitioning is responsive to the routing the delay-sensitive message on the control plane of the application layer; and maintaining, by the processing system, the radio circuit of the communication device in the low-power sleep mode, wherein the maintaining is responsive to the routing the non-delay sensitive message on the user plane of the application layer.

* * * * *